(No Model.)
H. G. SHEPARD.
VEHICLE WHEEL.
No. 558,316. Patented Apr. 14, 1896.
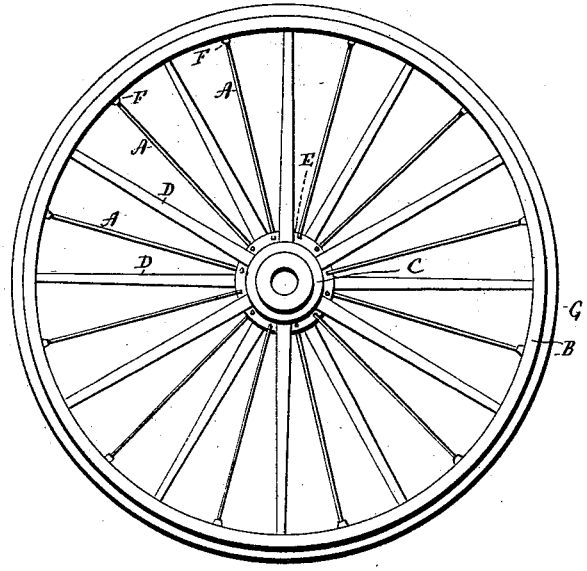
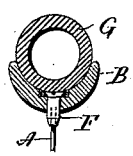
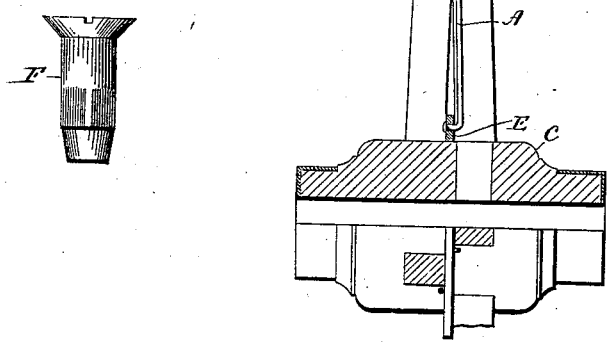
Witnesses
J. H. Shumway
Lillian D. Kelsey
Harvey G. Shepard,
Inventor.
By Attys
Earle & Seymour

United States Patent Office.

HARVEY G. SHEPARD, OF NEW HAVEN, CONNECTICUT, ASSIGNOR TO H. G. SHEPARD & SONS, OF SAME PLACE.

VEHICLE-WHEEL.

SPECIFICATION forming part of Letters Patent No. 558,316, dated April 14, 1896.

Application filed January 14, 1895. Serial No. 534,851. (No model.)

*To all whom it may concern:*

Be it known that I, HARVEY G. SHEPARD, of New Haven, in the county of New Haven and State of Connecticut, have invented a new Improvement in Wooden Vehicle-Wheels; and I do hereby declare the following, when taken in connection with the accompanying drawings and the letters of reference marked thereon, to be a full, clear, and exact description of the same, and which said drawings constitute part of this specification, and represent, in—

Figure 1, a view in side elevation of one form which a wooden vehicle-wheel constructed in accordance with my invention may assume; Fig. 2, a broken view thereof in section; Fig. 3, a detached view of one of the nipples employed for connecting the stay-rods with the rim.

Heretofore pneumatic-tired wooden wheels have been provided with a metal tire-like band interposed between the wooden wheel-rim and the pneumatic tire for the purpose of binding the several parts of the wheel solidly together. The use of such bands has been, however, found to be objectionable for several reasons, among which may be mentioned expense, increase of weight, liability to cut the pneumatic tire when the same is in use, and the difficulty of contracting the band for tightening up the wheel in case its parts get loose.

The object of my present invention is to avoid the objections above recited and to produce at a comparatively low cost for manufacture a superior wheel, which shall be at once light, strong, rigid, and perfectly adapted to be tightened without disturbing the pneumatic tire.

With these ends in view my invention consists in certain details of construction and combinations of parts, as will be hereinafter described, and pointed out in the claim.

In carrying out my invention, as shown in the drawings, I employ a series of radially-arranged stay-rods A, connecting the concavo-convex wooden rim B and the hub C of the wheel and alternated in arrangement with the wooden spokes D thereof, but the regular alternation of the stay-rods and spokes is not necessary to my invention. The inner ends of the said stay-rods are headed and bent at a right angle for their attachment to a perforated ring or band E, located upon the center of the said hub and interposed between the staggered inner ends of the spokes D, which hold it against sidewise movement in either direction. The outer ends of the rods are threaded and inserted into interiorly-threaded nipples F, mounted in the wheel-rim and having their projecting ends squared for the application of a wrench or other means for turning them, whereby the stay-rods may be independently adjusted for tension.

The shape and particular construction of the hub, spokes, and wheel-rim may be varied as desired, and also the shape and particular construction of the ring, stay-rods, and nipples.

As herein shown, the pneumatic tire G is a simple pipe, but any pneumatic tire of approved construction may be employed.

It will be clearly understood that by means of the stay-rods the wooden wheel is given all the advantages of a wheel of the suspension type—that is to say, a wheel in which the weight is carried by wire or equivalent spokes placed under high tension. The said stay-rods are adapted to be independently adjusted for tension, and bind the hub, rim, and wooden spokes together into one virtually integral structure. There is, therefore, no use for the metal tire-like band heretofore employed. The expense and bother of such a band are thus saved and the liability of the band to cut the tire when the same is in use avoided. Furthermore, in case the wheel becomes loose it is only necessary to tighten up the stay-rods to restore it to its proper rigidity, whereas under the prior construction it was necessary to remove the metal tire-like band and cut out a section of it to reduce its diameter and then reunite its ends by brazing, then expand it by heating, and replace it on the rim.

It is obvious that a wheel constructed in accordance with my invention may take still other forms. I would therefore have it understood that I do not limit myself to the exact construction shown and described, but hold myself at liberty to make such changes and alterations as fairly fall within the spirit and scope of my invention.

I am aware that a wheel having tension-rods connecting its rim and hub and located between the spokes is old. I am further aware that a wheel having a ring located between the inner ends of staggered spokes is old. I am further aware that a wheel having nipples located at the outer ends of its spokes for adjusting them in tension is old. I do not therefore claim any of these constructions broadly.

Having fully described my invention, what I claim as new, and desire to secure by Letters Patent, is—

In a vehicle-wheel, the combination with a wooden hub, of staggered wooden spokes, a wooden rim, a pneumatic tire applied to the said rim, a flat metal ring applied edgewise to the central portion of the said wooden hub between the staggered inner ends of the spokes, and constructed with transverse perforations or openings, metal stay-rods connected at their inner ends with the said ring through the openings formed therein, and threaded at their outer ends, and internally-threaded nipples mounted in the rim so as to be rotatable therein, projecting inward therefrom so as to be independently engaged for rotation, and receiving the threaded outer ends of the stay-rods which they connect with the rim and adjust in tension, substantially as and for the purpose set forth.

In testimony whereof I have signed this specification in the presence of two subscribing witnesses.

HARVEY G. SHEPARD.

Witnesses:
ELLA M. GRANNISS,
FRED C. EARLE.